(12) United States Patent
Zhang

(10) Patent No.: US 11,797,585 B2
(45) Date of Patent: Oct. 24, 2023

(54) DATA UPDATING METHOD AND APPARATUS, ELECTRONIC DEVICE AND COMPUTER READABLE STORAGE MEDIUM

(71) Applicant: BOE Technology Group Co., Ltd., Beijing (CN)

(72) Inventor: Chunhui Zhang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 119 days.

(21) Appl. No.: 17/426,344

(22) PCT Filed: Feb. 18, 2021

(86) PCT No.: PCT/CN2021/076750
§ 371 (c)(1),
(2) Date: Jul. 28, 2021

(87) PCT Pub. No.: WO2021/169842
PCT Pub. Date: Sep. 2, 2021

(65) Prior Publication Data
US 2022/0318286 A1    Oct. 6, 2022

(30) Foreign Application Priority Data
Feb. 24, 2020 (CN) .......... 202010113895.5

(51) Int. Cl.
*G06F 16/00* (2019.01)
*G06F 16/332* (2019.01)
(Continued)

(52) U.S. Cl.
CPC ........ *G06F 16/3329* (2019.01); *G06F 16/358* (2019.01); *G06N 5/022* (2013.01)

(58) Field of Classification Search
CPC .... G06F 16/3329; G06F 16/358; G06N 5/022
(Continued)

(56) References Cited

U.S. PATENT DOCUMENTS

| 2010/0228540 | A1 | 9/2010 | Bennett |
| 2014/0280307 | A1 | 9/2014 | Gupta et al. |

(Continued)

FOREIGN PATENT DOCUMENTS

| CN | 104866593 A | 8/2015 |
| CN | 105868313 A | 8/2016 |

(Continued)

OTHER PUBLICATIONS

Zhou, Hui-yang, machine translated CN110163281A; Aug. 23, 2019, 28 pages.*

(Continued)

*Primary Examiner* — Monica M Pyo
(74) *Attorney, Agent, or Firm* — WHDA, LLP

(57) ABSTRACT

The present disclosure provides a data updating method and apparatus, electronic device, and computer readable storage medium. The method includes: acquiring a search sentence; determining a target query sentence corresponding to the search sentence according to a sentence type corresponding to the search sentence; determining a target search content according to the search sentence, and sending the target search content to a service side, in the case that a query result corresponding to the target query sentence is not found in a knowledge base; acquiring a target query result edited by the service side according to the target search content; and updating the knowledge base according to the target query result.

17 Claims, 8 Drawing Sheets

(51) Int. Cl.
*G06F 16/35* (2019.01)
*G06N 5/022* (2023.01)

(58) Field of Classification Search
USPC .......................................................... 707/722
See application file for complete search history.

(56) References Cited

U.S. PATENT DOCUMENTS

| 2015/0363509 A1 | 12/2015 | Maghoul et al. |
| 2018/0137424 A1 | 5/2018 | Gabaldon Royval et al. |

FOREIGN PATENT DOCUMENTS

| CN | 110163281 A | 8/2019 |
| CN | 111353049 A | 6/2020 |

OTHER PUBLICATIONS

Wang Dong-hui et al., machine translated CN105868313A; Aug. 17, 2016, 9 pages.*

Extended (Supplementary)European Search Report dated Jul. 4, 2023, issued in counterpart EP Application No. 21759855.6. (9 pages).

* cited by examiner

DATA UPDATING METHOD AND APPARATUS, ELECTRONIC DEVICE AND COMPUTER READABLE STORAGE MEDIUM

The application claims priority to Chinese Patent Application No. 202010113895.5, titled "DATA UPDATING METHOD AND APPARATUS, ELECTRONIC DEVICE AND COMPUTER READABLE STORAGE MEDIUM" and filed to the State Patent Intellectual Property Office on Feb. 24, 2020, the contents of which are incorporated herein by reference in its entirety.

TECHNICAL FIELD

The present disclosure relates to the field of data processing technologies and, more particularly, to a data updating method and apparatus, electronic device, and computer readable storage medium.

BACKGROUND

With the development of the Internet and big data technology, the data of various industries has increased exponentially. How to effectively process and utilize massive amounts of data is of great value.

Knowledge graph uses graphs to store knowledge, and brings new ideas to the information processing system to understand and process natural language. Currently, it is widely used in intelligent question answering and assistant decision-making. People are becoming more and more dependent on the knowledge graph. However, the knowledge graph is very complicated, and users cannot quickly obtain the knowledge they want by directly observing the graph itself. Through the knowledge graph visualization technology, the knowledge graph can be visually displayed from different dimensions, and it is convenient for users to understand and use the content of the knowledge graph more efficiently.

Visualization technology has been born for a long time, but the technology for visualizing knowledge graphs in vertical fields has yet to be improved. Existing knowledge graph visualization services are basically simple graphical visualization of graph content, while knowledge graphs in vertical fields need to be displayed in multiple directions for different users in the field, to facilitate in-depth mining and analysis of data.

Knowledge graphs in vertical fields need to be continuously accumulated and updated, and generally rely on the experience of knowledge base managers to determine which knowledge needs to be added to the knowledge base, and it can be effectively combined with the knowledge retrieval process.

SUMMARY

The present disclosure provides a data updating method and apparatus, electronic device, and computer readable storage medium.

The present disclosure discloses a data updating method, the method comprises:
  acquiring a search sentence;
  determining a target query sentence corresponding to the search sentence according to a sentence type corresponding to the search sentence;
  determining a target search content according to the search sentence, and sending the target search content to a service side, in the case that a query result corresponding to the target query sentence is not found in a knowledge base;
  acquiring a target query result edited by the service side according to the target search content; and
  updating the knowledge base according to the target query result.

Optionally, determining a target search content according to the search sentence, in the case that a query result corresponding to the target query sentence is not found in a knowledge base, and sending the target search content to a service side comprises:
  performing clustering processing for a plurality of search sentences within a preset time period, in the case that the query result corresponding to the target query sentence is not found in a knowledge base, and obtaining at least one clustering search content; and
  sending the target search content that meets a preset condition in the at least one clustering search content to the service side.

Optionally, determining a target query sentence corresponding to the search sentence according to a sentence type corresponding to the search sentence, comprises:
  mapping the search sentence as the target query sentence, in the case that the sentence type corresponding to the search sentence is an entity word type.

Optionally, determining a target query sentence corresponding to the search sentence according to a sentence type corresponding to the search sentence, comprises:
  invoking a pre-trained sentence recognition model to process the search sentence, in the case that the sentence type corresponding to the search sentence is a natural sentence type, and determining the target query sentence corresponding to the search sentence.

Optionally, invoking a pre-trained sentence recognition model to process the search sentence, and determining the target query sentence corresponding to the search sentence comprises:
  inputting the search sentence into the sentence recognition model;
  acquiring a word vector corresponding to the search sentence;
  invoking a Bi-Long Short-Term Memory model layer to performing encoding processing for the word vector, and obtaining an encoding vector corresponding to the word vector;
  invoking a Long Short-Term Memory model layer to performing decoding processing for the encoding vector, and obtaining a decoding word vector;
  invoking a classification layer to performing entity recognition processing for a decoding entity word, and determining an entity word contained in the search sentence and an entity type corresponding to the entity word;
  invoking a Convolutional Neural Network layer to performing classification processing for the search sentence, and determining the sentence type corresponding to the search sentence; and
  determining the target query sentence according to the entity word, the entity type, and the sentence type.

Optionally, determining the target query sentence according to the entity word, the entity type and the sentence type comprises:
  invoking the sentence recognition model to determine a query template corresponding to the sentence type according to the sentence type; and
  determining the target query sentence according to the query template, the entity word, and the entity type.

Optionally, a pre-training method of the sentence recognition model comprises:

acquiring a plurality of training samples, the training samples comprises natural sentence; and training an initial sentence recognition model according to a plurality of natural sentences, and obtaining the sentence recognition model.

Optionally, training an initial sentence recognition model according to a plurality of natural sentences, and obtaining the sentence recognition model comprises:

inputting each natural sentence into the initial sentence recognition model;

acquiring a word vector corresponding to the natural sentence;

invoking a Bi-Long Short-Term Memory model to performing encoding processing for each word vector, and obtaining an encoding vector corresponding to the initial word vector;

invoking a Long Short-Term Memory model to performing decoding processing for each encoding vector, and obtaining an entity word corresponding to the natural sentence;

hybrid inputting each encoding vector into a Convolutional Neural Network, and determining a prediction sentence type corresponding to the search sentence;

calculating a loss value corresponding to the initial sentence model, according to the prediction sentence type and the initial sentence type; and regarding the initial sentence model as the sentence recognition model in the case that the loss value is within a preset range.

Optionally, determining a target query sentence corresponding to the search sentence according to a sentence type corresponding to the search sentence, comprises:

classifying the search sentence in the case that a sentence type corresponding to the search sentence is a natural sentence type, and determining a target query template corresponding to the search sentence, according to prefabricated corresponding relationship between types of the search sentences and a plurality of query templates;

performing entity recognition processing for the search sentence, and determining an entity word contained in the search sentence; and determining the target query sentence according to the target query template and the entity word.

Optionally, sending the target search content that meets a preset condition in the at least one clustering search content to the service side, comprises:

acquiring a popularity attribute value corresponding to the at least one clustering search content;

acquiring a clustering search content with the popularity attribute value greater than or equal to a set attribute value in the at least one clustering search content, according to each popularity attribute value, determining the clustering search content with the popularity attribute value greater than or equal to the set attribute value as the target search content; and sending the target search content to the service side.

Optionally, after the step of determining a target query sentence corresponding to the search sentence according to a sentence type corresponding to the search sentence, the method further comprises:

acquiring text information and graphical information corresponding to the query result, in the case that the query result is acquired in the knowledge base according to the target query sentence; and sending the text information and the graphical information to a user.

Optionally, acquiring text information and graphical information corresponding to the query result, in the case that the query result is acquired in the knowledge base according to the target query sentence, comprises:

converting a data of the query result into a graph, and obtaining graphical information corresponding to the query result.

The present disclosure discloses a data updating apparatus, the apparatus comprises:

a search sentence acquisition module configured for, acquiring a search sentence;

a target query sentence determination module configured for, determining a target query sentence corresponding to the search sentence according to a sentence type corresponding to the search sentence;

a target search content acquisition module configured for, determining a target search content according to the search sentence, and sending the target search content to a service side, in the case that a query result corresponding to the target query sentence is not found in a knowledge base;

a target query result acquisition module configured for, acquiring a target query result edited by the service side according to the target search content; and a knowledge base updating module configured for, updating the knowledge base according to the target query result.

Optionally, the target search content acquisition module comprises:

a search content acquisition unit configured for, performing clustering processing for a plurality of search sentences within a preset time period, in the case that the query result corresponding to the target query sentence is not found in a knowledge base, and obtaining at least one clustering search content; and a search content sending unit configured for, sending the target search content that meets a preset condition in the at least one clustering search content to the service side.

Optionally, the target query sentence determination module comprises:

a target query sentence acquisition unit configured for, mapping the search sentence as the target query sentence, in the case that the sentence type corresponding to the search sentence is an entity word type.

Optionally, the target query sentence determination module comprises:

a target query sentence determination unit configured for, invoking a pre-trained sentence recognition model to process the search sentence, in the case that the sentence type corresponding to the search sentence is a natural sentence type, and determining the target query sentence corresponding to the search sentence.

Optionally, the target query sentence determination unit comprises:

a search sentence input subunit configured for, inputting the search sentence into the sentence recognition model;

a word vector acquisition subunit configured for, acquiring a word vector corresponding to the search sentence;

an encoding vector acquisition subunit configured for, invoking a Bi-Long Short-Term Memory model layer to performing encoding processing for the word vector, and obtaining an encoding vector corresponding to the word vector;

a decoding word vector acquisition subunit configured for, invoking a Long Short-Term Memory model layer to performing decoding processing for the encoding vector, and obtaining a decoding word vector;

an entity word determination subunit configured for, invoking a classification layer to performing entity recognition processing for a decoding entity word, and determining an entity word contained in the search sentence and an entity type corresponding to the entity word;

a sentence type determination subunit configured for, invoking a Convolutional Neural Network layer to performing classification processing for the search sentence, and determining the sentence type corresponding to the search sentence; and a target query sentence determination subunit configured for, determining the target query sentence according to the entity word, the entity type, and the sentence type.

Optionally, the target query sentence determination subunit comprises:

a query template determination subunit configured for, invoking the sentence recognition model to determine a query template corresponding to the sentence type according to the sentence type; and a query sentence determination subunit configured for, determining the target query sentence according to the query template, the entity word, and the entity type.

Optionally, the apparatus further comprises:

a training samples acquisition module configured for, acquiring a plurality of training samples, the training samples comprises natural sentence; and a sentence recognition model training module configured for, training an initial sentence recognition model according to a plurality of natural sentences, and obtaining the sentence recognition model.

Optionally, the sentence recognition model training module comprises:

a natural sentence input unit configured for, inputting each natural sentence into the initial sentence recognition model;

a word vector acquisition unit configured for, acquiring a word vector corresponding to the natural sentence;

an encoding vector acquisition unit configured for, invoking a Bi-Long Short-Term Memory model to performing encoding processing for each word vector, and obtaining an encoding vector corresponding to the initial word vector;

an entity word acquisition unit configured for, invoking a Long Short-Term Memory model to performing decoding processing for each encoding vector, and obtaining an entity word corresponding to the natural sentence;

a prediction sentence type determination unit configured for, hybrid inputting each encoding vector into a Convolutional Neural Network, and determining a prediction sentence type corresponding to the search sentence;

a loss value calculation unit configured for, calculating a loss value corresponding to the initial sentence model, according to the prediction sentence type and an initial sentence type; and a sentence recognition model determination unit configured for, regarding the initial sentence model as the sentence recognition model in the case that the loss value is within a preset range.

Optionally, the target query sentence determination module comprises:

a target query template determination unit configured for, classifying the search sentence in the case that a sentence type corresponding to the search sentence is a natural sentence type, and determining a target query template corresponding to the search sentence, according to prefabricated corresponding relationship between types of the search sentences and a plurality of query templates;

an entity word determination unit configured for, performing entity recognition processing for the search sentence, and determining an entity word contained in the search sentence; and a target query sentence determination unit configured for, determining the target query sentence according to the target query template and the entity word.

Optionally, the search content sending unit comprises:

a popularity attribute value acquisition subunit configured for, acquiring a popularity attribute value corresponding to the at least one clustering search content;

a search content determination subunit configured for, acquiring a clustering search content with the popularity attribute value greater than or equal to a set attribute value in the at least one clustering search content, according to each popularity attribute value, determining the clustering search content with the popularity attribute value greater than or equal to the set attribute value as the target search content; and a search content sending subunit configured for, sending the target search content to the service side.

Optionally, the apparatus further comprises:

a text graphical information acquisition module configured for, acquiring text information and graphical information corresponding to the query result, in the case that the query result is acquired in the knowledge base according to the target query sentence; and a text graphical information sending module configured for, sending the text information and the graphical information to a user.

The present disclosure discloses an electronic device, the electronic device comprises:

a processor, a memory, and a computer program stored in the memory and executed by the processor, when the computer program is executed by the processor, the above data updating method are performed.

The present disclosure discloses a computer-readable storage medium, when instructions in the storage medium are executed by a processor of an electronic device, the instructions cause the electronic device to perform the above data updating method.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present application are provided below.

BRIEF DESCRIPTION OF THE DRAWINGS

In order to more clearly illustrate the technical solutions of the embodiments of the present disclosure or the prior art, the figures that are required to describe the embodiments or the prior art will be briefly introduced below. Apparently, the figures that are described below are embodiments of the present application, and a person skilled in the art can obtain other figures according to these figures without paying creative work.

DETAILED DESCRIPTION

Detailed description of the present disclosure will further be made with reference to drawings and embodiments, in order to make the above objectives, features and advantages of the present disclosure more apparent and lucid.

Figure 1:
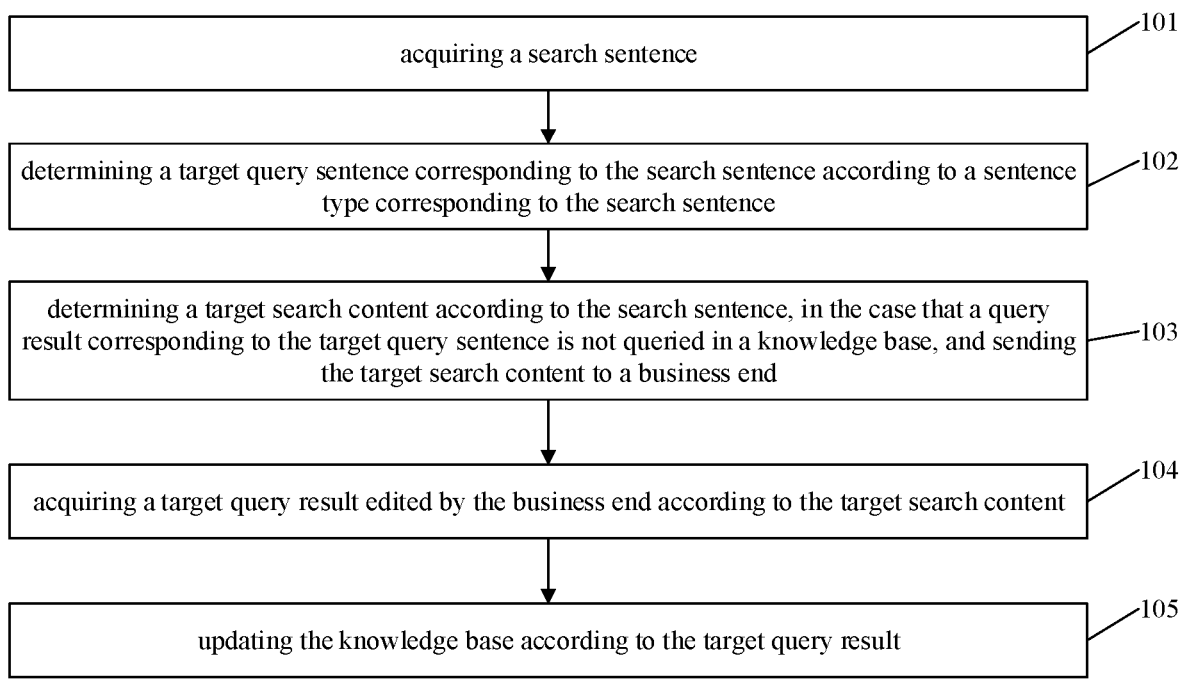
FIG. 1 illustrates a flow chart of the steps of a data updating method according to an embodiment of the present disclosure.

With reference to FIG. 1, it is illustrated a flow chart of the steps of a data updating method according to an embodiment of the present disclosure, the data updating method may specifically include the following steps:

step 101: acquiring a search sentence.

In the embodiment of the present disclosure, the search sentence refers to the sentence used to obtain the corresponding search information In some examples, the search sentence may be a sentence inputted by a user in a preset search box. For example, when the user needs to query some information, the search box may be opened, and the corresponding information inputted into the search box may be regarded as the search sentence.

In some examples, the search sentence may be a sentence obtained from a voice input by the user. For example, the user may input the voice of the information needed to be acquired through a designated voice input interface, and then the voice inputted by the user is recognized by the question and answering system to obtain the search sentence.

It should be understood that the foregoing examples are only examples for better understanding of the technical solutions of the embodiments of the present disclosure, and are not intended as the only limitation to the embodiments of the present disclosure.

After acquiring the search sentence inputted by the user, step 102 is performed.

Step 102: determining a target query sentence corresponding to the search sentence according to a sentence type corresponding to the search sentence.

The sentence type refers to a type corresponding to the search sentence, in the present disclosure, the sentence type may be divided into: entity word type and natural sentence type.

In the case that the sentence type is the entity word type, the search statement may be directly mapped as the query statement.

In the case that the sentence type is the natural sentence type, the search statement may be recognized by invoking the sentence recognition model, to obtain query sentence corresponding to the search sentence.

The above two forms will be described in detail in the following embodiments, and the embodiments of the present disclosure will not be repeated here.

In the question and answering system, the corresponding relationship between sentence types and query sentences may be saved in advance, as shown in Table 1 below:

TABLE 1

| Sentence types | Query sentences |
|---|---|
| A | a |
| B | b |
| C | c |

From the above table 1, it can be seen that the sentence types include A, B, and C, and the query sentences include a, b, and c. There is a corresponding relationship between A and a, a corresponding relationship between B and b, and a corresponding relationship between C and c. While in the case that the sentence type of the search sentence is A, the target query sentence is a; and in the case that the sentence type of the search sentence is C, the target query sentence is c.

It should be understood that the foregoing examples are only examples for better understanding of the technical solutions of the embodiments of the present disclosure, and are not intended as the only limitation to the embodiments of the present disclosure.

After acquiring the search sentence, the target query sentence corresponding to the search sentence may be determined according to the sentence type corresponding to the search sentence.

After determining the target query sentence corresponding to the search sentence according to the sentence type corresponding to the search sentence, step 103 is performed.

Step 103: determining a target search content according to the search sentence, in the case that a query result corresponding to the target query sentence is not found in a knowledge base, and sending the target search content to a service side.

The step 103 may include the following steps 103a and 103b:

step 103a, performing clustering processing for a plurality of search sentences within a preset time period, in the case that the query result corresponding to the target query sentence is not found in a knowledge base, and obtaining at least one clustering search content.

In the embodiment of the present disclosure, the knowledge base may be a database, and the database stores relevant knowledge in one or more fields. The database may be generated in advance by using existing information, or it may be information obtained from the network in real time or periodically by means of crawlers or the like. In some embodiments, it refers to a pre-generated database for storing relevant knowledge in various fields. The knowledge base may be obtained by collecting information in various fields on the Internet, such as the medical field and the chemical field. Specifically, it can be determined according to actual conditions, and the embodiments of the present disclosure do not impose restrictions on this.

In the present disclosure, the knowledge base may support the query of large-scale data. For example, the knowledge base may use the Neo4j graph database, which supports the query of large-scale data, has great flexibility and scalability, and has a built-in query language Cypher of graph database which is simple and easy-to-learn. Through the data storage module, the knowledge may be written into the Neo4j database in batches for subsequent use.

Clustering search content refers to search content that is composed of a plurality of search sentences and belongs to the same category.

In the embodiment, in the case that performing clustering, the K-means clustering algorithm may be used. The K-means algorithm is an unsupervised hard clustering algorithm, it is a representative of a typical prototype-based objective function clustering method. It uses a certain distance from the data point to the prototype as an optimized objective function, and uses functions to find the extremum to obtain the adjustment rule of the iterative operation. The specific steps of the K-means clustering algorithm may be: for a set of given search sentences, dividing the set of search sentences into K clusters according to the distance between the search sentences, so that the points in the clusters are connected as closely as possible, while the distance between clusters is as large as possible, and the type division of the plurality of search sentences is realized in this way, that is, at least one clustering search content is obtained.

Step 103b: sending the target search content that meets a preset condition in the at least one clustering search content to the service side.

The service side refers to a terminal for information editing and updating of knowledge graph.

In some examples, the service side may be a mobile terminal, such as a mobile phone or a tablet computer used to edit and update the information of the knowledge graph.

In some examples, the service side may be a personal computer (PC) end, such as a desktop computer or a laptop computer used to edit and update the information of the knowledge graph.

It should be understood that the foregoing examples are only examples for better understanding of the technical solutions of the embodiments of the present disclosure, and are not intended as the only limitation to the embodiments of the present disclosure.

The preset condition refers to a condition preset by the business personnel for determining whether the clustering search content meets the corresponding information result of editing.

In the embodiment, the preset condition may be the number of searches of each search sentence in the clustering search content, that is, the popularity of each search sentence.

Of course, it is not limited to this. In a specific implementation, the preset condition may also be other conditions. Specifically, it may be determined according to business requirements, which is not limited in the embodiment of the present disclosure.

The target search content refers to a content composed of the search sentences that need to be edited by the service side, that is, the search content composed of one type of the search sentences.

After performing clustering processing for the search sentences, and obtaining at least one clustering search content, each clustering search content may be analyzed to determine which of these clustering search contents is the clustering search content that meets the preset conditions, that is, the target search content, and the target search content is sent to the service side for information editing.

After sending the target search content that meets a preset condition in the at least one clustering search content to the service side, step 104 is further performed.

Step 104: acquiring a target query result edited by the service side according to the target search content The target query result refers to a query result edited by the service side according to the target search content, that is, the query result edited by the business personnel of the service side for the target search content.

After sending the target search content to the service side, the business personnel of the service side may edit the corresponding target query results for each search sentence in the target search content, and the service side will return the target query results edited by the business personnel to the question and answering system.

After the question and answering system acquires the target query results edited by the service side according to the target search content, the step 105 is performed.

Step 105: updating the knowledge base according to the target query result.

After the question and answering system acquires the target query results edited by the service side according to the target search content, the knowledge base may be updated according to the target query results. That is, in the knowledge base, each search sentence in the target search content is associated with the target query results and saved, so as to realize the update operation of the knowledge base.

In the present disclosure, in the case that the corresponding results are not found in the knowledge base according to the target search content of the clustering, there is no need to artificially determine that which knowledge needs to be added to the knowledge base, thereby reducing the waste of human resources.

The embodiment of the present disclosure provides a data updating method, by acquiring a search sentence, determining a target query sentence corresponding to the search sentence according to a sentence type corresponding to the search sentence, in the case that a query result corresponding to the target query sentence is not found in a knowledge base, performing clustering processing for the search sentences, and obtaining at least one clustering search content, sending the target search content that meets a preset condition in the at least one clustering search content to the service side, acquiring a target query result edited by the service side according to the target search content, and updating the knowledge base according to the target query result. The embodiment of the present disclosure directly sends the search content to the service side to edit, in the case that the corresponding results are not found according to the target search content of the clustering, there is no need to artificially determine that which knowledge needs to be added to the knowledge base, thereby reducing the waste of human resources, and saving labor cost.

Figure 2:
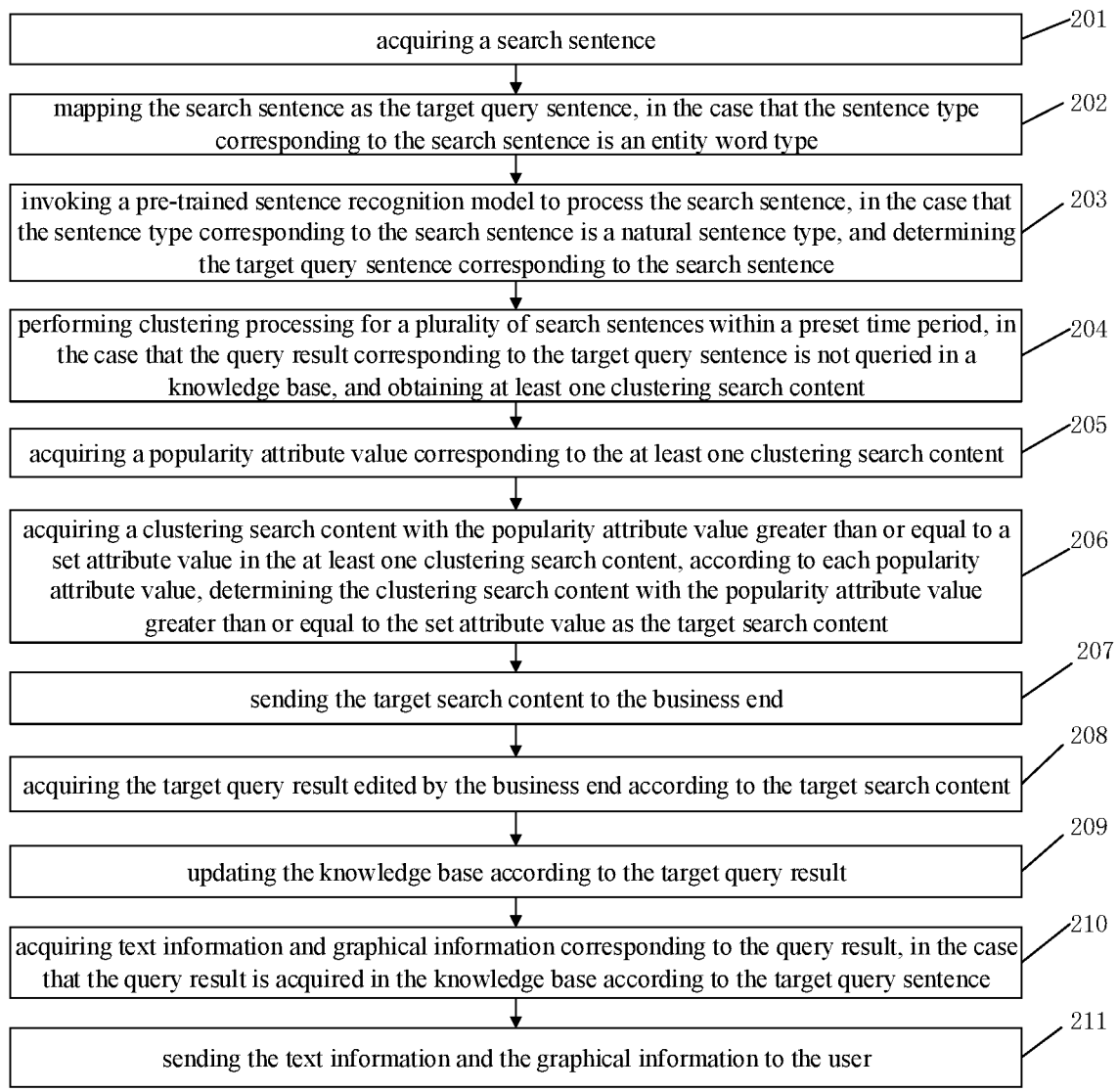
FIG. 2 illustrates a flow chart of the steps of another data updating method according to an embodiment of the present disclosure.

With reference to FIG. 2, it is illustrated a flow chart of the steps of another data updating method according to an embodiment of the present disclosure, the data updating method may specifically include the following steps:

step 201: acquiring a search sentence.

The search sentence refers to the sentence used to obtain the corresponding search information.

In some examples, the search sentence may be a sentence inputted by the user in the preset search box. For example, when the user needs to query some information, the search box may be opened, and the corresponding information inputted in the search box may be regarded as the search sentence.

In some examples, the search sentence may be a sentence obtained from the voice inputted by the user. For example, the user may input the voice of the information needed to be acquired through a designated voice input interface, and then the voice inputted by the user is recognized by the question and answering system to obtain the search sentence.

It should be understood that the foregoing examples are only examples for better understanding of the technical solutions of the embodiments of the present disclosure, and are not intended as the only limitation to the embodiments of the present disclosure.

After acquiring the search sentence, step 202 or step 203 is performed.

Step 202: mapping the search sentence as the target query sentence, in the case that the sentence type corresponding to the search sentence is an entity word type.

The entity word type refers to a type of the search sentence is an entity word, that is, a certain keyword, such as "xx disease", "xxx city", etc.

The target query sentence is a query sentence corresponding to the search sentence, in the case that the sentence type is the entity word type, the search statement may be directly mapped as the query statement. Take the entity word "pulmonary heart disease" as an example, input the entity word and select the "disease" type to query, the corresponding Cypher query sentence is:

MATCH (d:disease{entity:'pulmonary heart disease'}) RETURN d.

Step 203: invoking a pre-trained sentence recognition model to process the search sentence, in the case that the sentence type corresponding to the search sentence is a natural sentence type, and determining the target query sentence corresponding to the search sentence.

The natural sentence type refers to that the search sentence inputted by the user is a natural sentence, for example, "What is the medicine for treating xxx disease?" etc. The natural sentence is not a certain keyword, but a text formed by a paragraph of the natural sentences.

In the case that the sentence type corresponding to the search sentence is the natural sentence type, the pre-trained sentence recognition model may be invoked to recognize the search sentence, to determine the entity word contained in the search sentence, the entity type corresponding to the entity word, and the sentence type corresponding to the search sentence.

The training process of the sentence recognition model may be described in detail in combination with the following step M1 and step M2.

Step M1: acquiring a plurality of training samples, the training samples comprises natural sentence.

In the embodiment of the present disclosure, the training sample refers to the sample used to train the sentence recognition model.

In specific implementation, the specific number of the training samples can be preset by business personnel, such as 1000 training samples, 3000 training samples, etc. Specifically, it may be determined according to the actual situation, the embodiments of the present disclosure do not impose restrictions on this.

Each training sample may include natural sentences and structured query sentences corresponding to the natural sentences. The natural sentences refer to sentences formed by natural language for querying corresponding information, and the structured query sentences refer to query sentences corresponding to the query format of the knowledge base. For example, the natural sentence is a relatively straightforward sentence inputted by the user, for example, "What kind of medicine is better to treat pulmonary heart disease", and the corresponding structured query sentence may be MATCH d=(:disease{entity:"pulmonary heart disease"})-[r: medication]->( ) RETURN d.

While acquiring the plurality of training samples, each training sample is a natural sentence, and at the same time, the structured query sentence corresponding to each natural sentence may also be acquired.

After acquiring the plurality of training samples, step M2 is performed.

Step M2: training an initial sentence recognition model according to a plurality of natural sentences, and obtaining the sentence recognition model.

The initial sentence recognition model refers to an initial model that has not been trained.

After acquiring the plurality of training samples, the plurality of natural sentences and the structured query sentences corresponding to the plurality of natural sentences may be combined to train the initial sentence recognition model, to obtain the sentence recognition model.

After the sentence recognition model is trained, when the acquired input search sentence is a natural sentence in the subsequent process, the sentence recognition model may be directly used to recognize the query sentence corresponding to the search sentence.

The training process of the sentence recognition model may be described in detail in combination with the following specific implementations.

In a specific implementation of the present disclosure, the aforementioned step M2 may include: sub-step S1 to sub-step S7.

Sub-step S1: for each natural sentence, inputting each natural sentence into the initial sentence recognition model.

Figure 5:
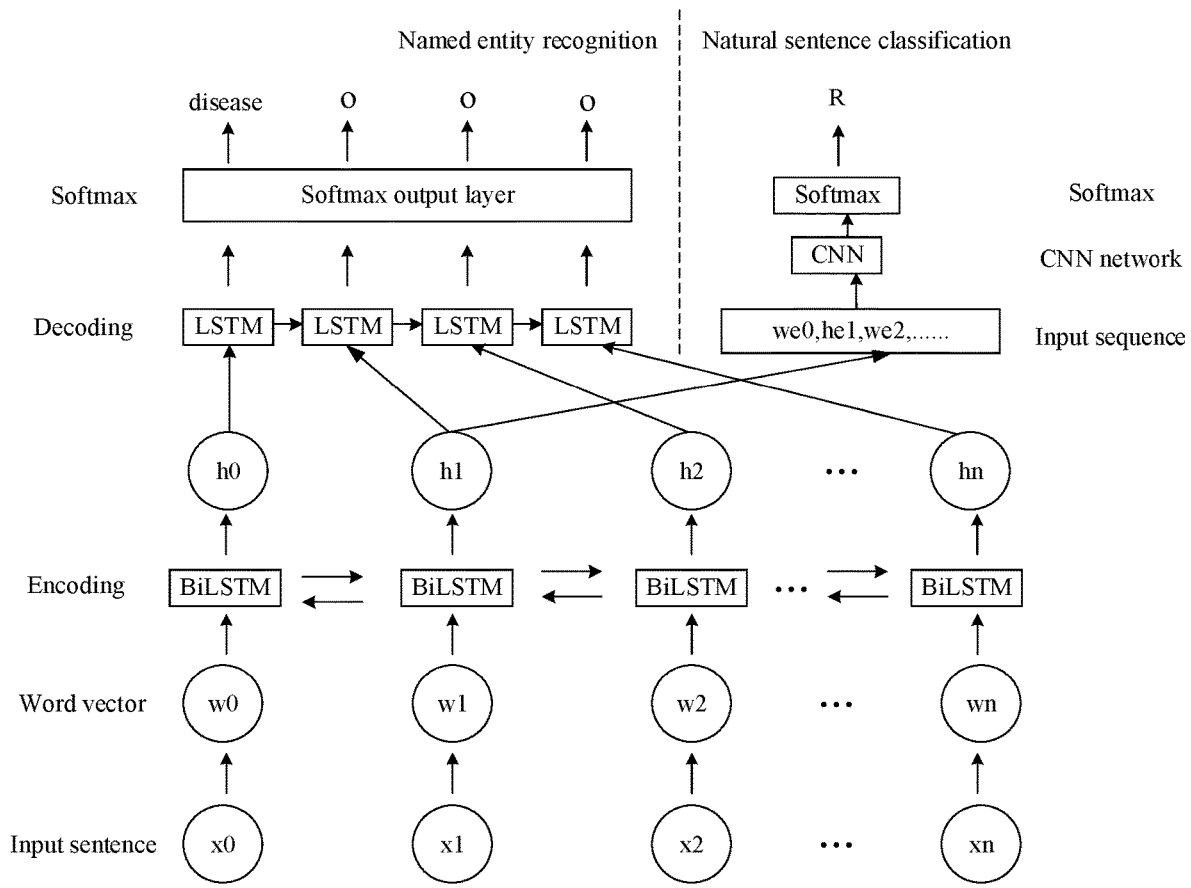
FIG. 5 illustrates a schematic diagram of a sentence recognition model according to an embodiment of the present disclosure.

In the embodiment of the present disclosure, the solution may be described in detail in combination with the model shown in FIG. 5.

After acquiring the plurality of natural sentences, each natural sentence may be input into the initial sentence recognition model, respectively, to train the initial sentence recognition model. After inputting each natural sentence into the initial sentence recognition model, sub-step S2 is performed.

Sub-step S2: acquiring a word vector corresponding to the natural sentence; each natural sentence corresponds to an initial sentence type.

After inputting the natural sentence into the initial sentence recognition model, the word vector corresponding to the natural sentence may be obtained. As shown in FIG. 5, the words of the natural sentence correspond to $X0, X1, X2, \ldots Xn$. Firstly, it may perform vector conversion processing for these words, to obtain the word vector of each word, that is, the word vector corresponding to $X0, X1, X2, \ldots Xn$ are: $w0, w1, w2, \ldots wn$, respectively, and then these word vectors may be input into a Bi-Long Short-Term Memory model (BiLSTM).

In the present disclosure, each natural sentence corresponds to an initial sentence type.

After acquiring the word vector corresponding to the natural sentence, sub-step S3 is performed.

Sub-step S3: invoking a Bi-Long Short-Term Memory model to performing encoding processing for each word vector, and obtaining an encoding vector corresponding to the initial word vector.

The encoding vector refers to an encoding vector corresponding to the word vector obtained after encoding the word vector of the natural sentence.

After obtaining the word vector corresponding to the natural sentence, the word vector corresponding to the natural sentence may be input into the BiLSTM, and the word vector of the natural sentence is encoded by the BiLSTM, and the encoding vector corresponding to each initial word vector can be obtained. As shown in FIG. 5, after invoking the BiLSTM to encode the input word vectors w0, w1, w2, . . . wn, the encoding vectors corresponding to these word vectors may be obtained, such as: h0, h1, h2, . . . h4.

After invoking a Bi-Long Short-Term Memory model to performing encoding processing for each word vector, and obtaining an encoding vector corresponding to the word vector, sub-step S4 and sub-step S5 are performed.

Sub-step S4: invoking a Long Short-Term Memory model to performing decoding processing for each encoding vector, and obtaining an entity word corresponding to the natural sentence.

The Long Short-Term Memory model (LSTM) may be configured for decoding the encoding vector.

Of course, in the present disclosure, after obtaining the encoding vector corresponding to the natural sentence, the LSTM may be invoked to decode each encoding vector, so that the entity word corresponding to the natural sentence may be obtained. As shown in FIG. 5, after the encoding vectors h0, h1, h2, . . . h4 are obtained, h0, h1, h2, . . . h4 may be input into the LSTM, so that h0, h1, h2, . . . h4 is decoded by the LSTM, thus, the entity words corresponding to the natural sentences are output through a softmax output layer.

Sub-step S5: hybrid inputting each encoding vector into a Convolutional Neural Network, and determining a prediction sentence type corresponding to the search sentence.

The prediction sentence type refers to the prediction type corresponding to the search sentence obtained by predicting the encoding vector through the Convolutional Neural Network (CNN).

After obtaining the encoding vectors h0, h1, h2, . . . h4, the encoding vectors h0, h1, h2, . . . h4 may be input into the CNN network layer, so that the CNN network layer may perform type recognition on the search sentence according to h0, h1, h2, . . . h4, to predict the prediction sentence type corresponding to the search sentence.

Sub-step S6: calculating a loss value corresponding to the initial sentence model, according to the prediction sentence type and the initial sentence type.

The loss value may represent the degree of deviation between the prediction intent value of the training sample (that is, the prediction sentence type) and the initial value of the training sample (that is, the initial sentence type).

After the prediction sentence type is obtained, the prediction sentence type and the initial sentence type may be matched, to determine the degree of deviation between the two, that is, to calculate the loss value corresponding to the initial sentence model.

After the loss value corresponding to the initial sentence model is calculated, sub-step S7 is performed.

Sub-step S7: regarding the initial sentence model as the sentence recognition model in the case that the loss value is within a preset range.

The preset range may be set according to actual application scenarios and actual requirements, and the embodiment of the present disclosure does not limit it.

Further, if the loss value is within the preset range, it may be considered that the deviation between the prediction intention value of each training sample and its true intention value is very small. At this time, it may be considered that the prediction intention value of the training sample is consistent with its true intention value, the initial sentence recognition model may correctly predict the true intention of the natural sentence, and accordingly, the initial sentence recognition model may be used as the final sentence recognition model.

It is understandable that the foregoing specific implementation are examples for a better understanding of the solutions of the embodiments of the present disclosure. In specific implementations, other recognition models may also be used, which are not limited in the embodiments of the present disclosure.

After training the initial sentence recognition model according to the plurality of natural sentences, and obtaining the sentence recognition model, in the following steps, natural sentences of the natural sentence type may be recognized according to the sentence recognition model.

Of course, in the model training process, the training samples also contain query sentence templates corresponding to different types of the search sentence, and in the process of recognizing the entity words and entity types of natural sentences, the recognized entity types may also be matched with the query sentence templates, to facilitate the use in the subsequent process.

Figure 7:
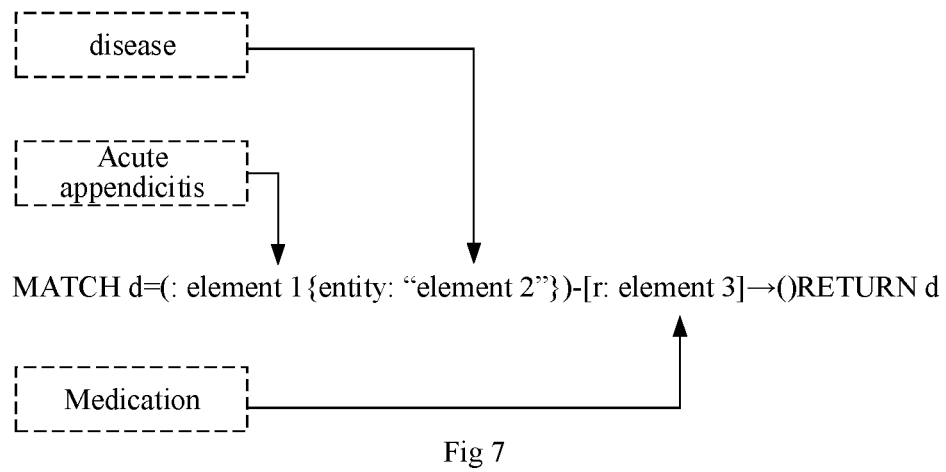
FIG. 7 illustrates a schematic diagram of query sentence template matching according to an embodiment of the present disclosure.

After obtaining the entity word contained in the search sentence and the entity type corresponding to the entity word, as well as the sentence type corresponding to the search sentence, the sentence recognition model may be used to invoke the query template corresponding to the entity type, to convert the entity word into a target query sentence. For example, the entity words, the entity types, and the sentence types corresponding to the search sentence may be filled into the Cypher query sentence, to obtain the final query sentence. For example, take "what medicine for acute appendicitis?" as an example to search, firstly, performing NER on the search sentence, to get the entity "acute appendicitis", the label is "disease", and the classification of the natural sentence is "medicine", as shown in FIG. 7, the label "disease" and the entity "acute appendicitis" may be input into the query template "MATCH d=(: element 1{entity:"element 2"})-[r: element 3]→( )RETURN d""

Specifically, it may be described in detail in combination with the following specific implementation manners.

In a specific implementation of the present disclosure, the foregoing step 203 may include:

sub-step M1: inputting the search sentence into the sentence recognition model;

sub-step M2: acquiring a word vector corresponding to the search sentence;

sub-step M3: invoking a Bi-Long Short-Term Memory model layer to performing encoding processing for the word vector, and obtaining an encoding vector corresponding to the word vector;

sub-step M4: invoking a Long Short-Term Memory model layer to performing decoding processing for the encoding vector, and obtaining a decoding word vector;

sub-step M5: invoking a classification layer to performing entity recognition processing for a decoding entity word, and determining an entity word contained in the search sentence and an entity type corresponding to the entity word;

sub-step M6: invoking a Convolutional Neural Network layer to performing type recognition processing for the search sentence, and determining the sentence type corresponding to the search sentence; and sub-step M7: determining the target query sentence according to the entity word, the entity type, and the sentence type.

In the embodiment of the present disclosure, the sentence recognition model may be invoked for recognizing the acquired search sentence, so as to determine the entity word contained in the search sentence and the entity type corresponding to the entity word, and the sentence type corresponding to the search sentence. Then, the query sentence template corresponding to the sentence type is invoked by the sentence recognition model, to convert the entity word into the standard query sentence of the question and answering system.

It is understandable that the implementation of the aforementioned sub-step M1 to the sub-step M7 are similar to the implementation of the aforementioned sub-step S2 to the sub-step S5, and will not be described in detail in the embodiment of the present disclosure.

Optionally, after acquiring the search sentence, the following sub-steps may also be performed:

sub-step N1: classifying the search sentence in the case that a sentence type corresponding to the search sentence is a natural sentence type, and determining a target query template corresponding to the search sentence, according to prefabricated corresponding relationship between types of the search sentences and a plurality of query templates;

sub-step N2: performing entity recognition processing for the search sentence, and determining an entity word contained in the search sentence; and sub-step N3: determining the target query sentence according to the target query template and the entity word.

In the embodiment, in the case that the type of the search sentence is a natural sentence type, a template matching method may also be used to determine the query sentence corresponding to the search sentence, specifically:

in the case that the type of the acquired search sentence is the natural sentence type, the template matching method may be used to classify the search sentences. In the question and answering system, the corresponding relationship between the type of the search sentence and the plurality of query templates may be pre-defined. Take the medical field as an example, according to existing information in the knowledge base and the search content of common medical knowledge, the corresponding relationship between 12 types of search sentences and 12 Cypher query templates is formulated, as shown in Table 2 below:

TABLE 2

| Types of search sentences | Number | Query templates |
| --- | --- | --- |
| Symptoms of the disease | 0 | MATCH s=(:disease{entity:" "})-[r: common symptoms]->( ) RETURN s |
| Causes of the disease | 1 | MATCH r=(:disease{entity:" "})-[r: common causes]->( ) RETURN r |
| How to treat the disease | 2 | MATCH c=(:disease{entity:" "})-[r: treatment]->( ) RETURN c |
| Prevention for the disease | 3 | MATCH p=(:disease{entity:" "})-[r: prevention]->( ) RETURN p |
| What medicine to take for the disease | 4 | MATCH d=(:disease{entity:" "})-[r: medication]->( ) RETURN d |
| What disease does the drug treat | 5 | MATCH d=(:drug{entity:" "})<-[r: medication]-( ) RETURN d |
| What to inspect for the disease | 6 | MATCH c=(:disease{entity:" "})-[r: recommended inspection]-( ) RETURN c |
| Common population of the disease | 7 | MATCH p=(:disease{entity:" "})-[r: common population]-( ) RETURN p |
| The site of the disease | 8 | MATCH p=(:disease{entity:" "})-[r: site of the disease]-( ) RETURN p |
| Treatment department of the disease | 9 | MATCH r=(:disease{entity:" "})-[r: treatment department]-( ) RETURN r |
| Whether the disease is contagious | 10 | MATCH i=(:disease{entity:" "})-[r: infectivity]-( ) RETURN i |
| Route of disease transmission | 11 | MATCH r=(:disease{entity:" "})-[r: route of transmission]-( ) RETURN r |

From Table 2, it can be seen that, in the case that the type of the search sentence is the symptoms of the diseases, the corresponding target query template is: MATCH s=(:disease{entity:" "})-[r: common symptoms]->( ) RETURN s . In the case that the type of the search sentence is how to treat the disease, the corresponding target query template is: MATCH c=(:disease{entity:" "})-[r: treatment]->( ) RETURN c and so on.

In another example, after classifying the search sentence, it is mapped into a corresponding Cypher query sentence template. At this time, it needs to recognize the entity in the search sentence to fill the Cypher query sentence completely. The present disclosure uses word segmentation and a BiLSTM-CRF model to recognize medical entities in the search sentences. After generating the Cypher query statement, query it in the Neo4j graph database, and then directly return the query result to a front-end interface. Take "what medicine to take for acute appendicitis?" as an example to search, firstly, classify the search sentence as type 4, the corresponding Cypher query sentence template is: MATCH d=(:disease{entity:" "})-[r:medication]->( ) RETURN d. Then perform named entity recognition, and fill the obtained medical entity "acute appendicitis" into the query template: MATCH d=(:disease{entity:"acute appendicitis"})-[r: medication]->( )RETURN d.

In the case that the type of the acquired search sentence is the natural sentence type, the pre-saved corresponding relationship between the search type and the query template may be combined, to obtain the query template corresponding to the search sentence, and the query template is invoked to convert the search sentence into the standard query sentence corresponding to the question and answering system, that is, the target query sentence.

After acquiring the target query sentence corresponding to the search sentence, step 204 is performed.

Step 204: performing clustering processing for a plurality of search sentences within a preset time period, in the case that the query result corresponding to the target query sentence is not found in a knowledge base, and obtaining at least one clustering search content.

The knowledge base refers to a pre-generated database used to store relevant knowledge in various fields. In the present disclosure, the knowledge base may be obtained by collecting information in various fields on the Internet, such as the medical field, the chemical field, etc., specifically, it may be determined according to the actual situation, and the embodiment of the present disclosure does not impose restrictions on this, and the knowledge base is also the knowledge graph.

In the embodiment, the knowledge graph takes the medical field as an example. Specifically, the underlying knowledge graph may contain 14 entities and 13 relationships, as shown in Table 3 below:

TABLE 3

| Number | Entities | Number | Relationship |
|---|---|---|---|
| 1 | Name of the disease | 1 | Disease - Treatment department |
| 2 | Disease - Chinese alternative names | 2 | Disease - Route of transmission |
| 3 | Disease -English alternative names | 3 | Disease Infectivity |
| 4 | Treatment department | 4 | Disease - English alternative names |
| 5 | Route of transmission | 5 | Disease - Chinese alternative names |
| 6 | Infectivity | 6 | Disease - Common population |
| 7 | Common population | 7 | Disease - Site of the disease |
| 8 | Site of the disease | 8 | Disease - medication |
| 9 | Drug names | 9 | Disease - Prevention |
| 10 | Prevention measures | 10 | Disease - Symptoms |
| 11 | Common symptoms | 11 | Disease - Causes |
| 12 | Common causes | 12 | Disease - Inspection |
| 13 | Recommended inspection | 13 | Disease - Treatment |
| 14 | Treatment measures | | |

Figure 6:
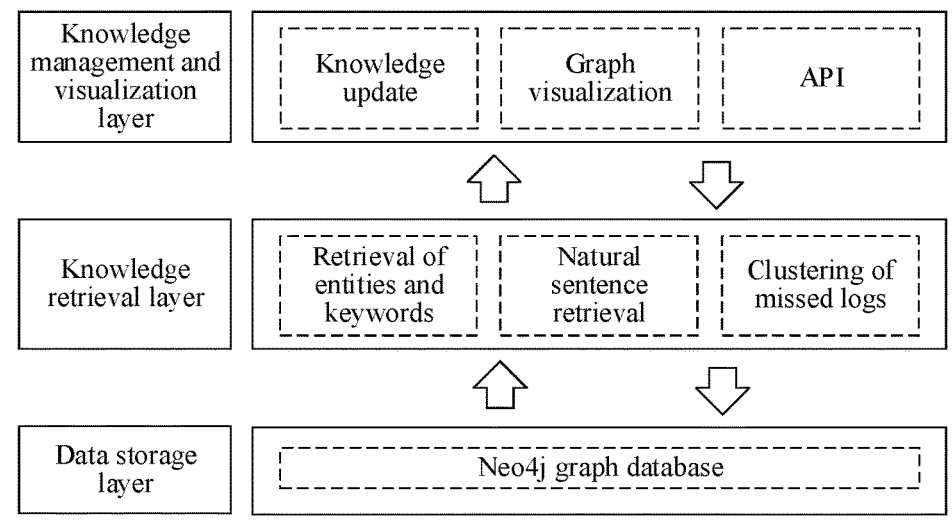
FIG. 6 illustrates a schematic diagram of a system of medical knowledge management and visual analysis based on knowledge graph according to an embodiment of the present disclosure.

In the present disclosure, the knowledge base may use the Neo4j graph database, which supports large-scale data query, has great flexibility and scalability, and has a built-in graph database query language Cypher that is simple and easy-to-learn. Through the data storage module contained in the data storage layer as shown in FIG. 6, knowledge may be written into the neo4j database in batches for subsequent use.

Clustering search content refers to the search content that is composed of the plurality of search sentences within a certain time period and belongs to the same category.

In the embodiment, in the case that performing clustering, the K-means clustering algorithm may be used. The K-means algorithm is an unsupervised hard clustering algorithm, it is a representative of a typical prototype-based objective function clustering method. It uses a certain distance from the data point to the prototype as an optimized objective function, and uses functions to find the extremum to obtain the adjustment rule of the iterative operation. The specific steps of the K-means clustering algorithm may be: for a set of given search sentences, that is, a set of the plurality of search sentences within a certain time period, dividing the set of search sentences into K clusters according to the distance between the search sentences, so that the points in the clusters are connected as closely as possible, while the distance between clusters is as large as possible, and the type division of the plurality of search sentences is realized in this way, that is, at least one clustering search content is obtained.

After performing clustering processing for search sentences, and obtaining at least one clustering search content, the step 205 is performed.

Step 205: acquiring a popularity attribute value corresponding to the at least one clustering search content.

The popularity attribute value may reflect the popularity of all search sentences in the clustering search content within a certain time period from the current time, such as the number of searches corresponding to the search sentence, or the number of clicks on the search sentence.

After performing clustering processing for search sentences, and obtaining at least one clustering search content, the popularity attribute value corresponding to each clustering search content may be acquired, and the step 206 is performed.

Step 206: acquiring a clustering search content with the popularity attribute value greater than or equal to a set attribute value in the at least one clustering search content, according to each popularity attribute value, determining the clustering search content with the popularity attribute value greater than or equal to the set attribute value as the target search content.

The target search content refers to the content composed of search sentences that need to be edited by the service side, that is, the search content composed of one type of search sentences.

The set attribute value refers to the attribute value preset by the business personnel for comparison with the popularity attribute value corresponding to the search sentence.

The specific numerical value of the set attribute value may be determined according to actual conditions, which is not limited in the embodiment of the present disclosure.

After the popularity attribute value of each clustering search content is obtained, the popularity attribute value of each clustering search content and the set attribute value may be compared, and the clustering search content with the popularity attribute value greater than or equal to the set attribute value in each clustering search content is acquired, and the clustering search content with the popularity attribute value greater than or equal to the set attribute value is determined as the target search content.

After the target search content is determined, step 207 is performed.

Step 207: sending the target search content to the service side.

The service side refers to a terminal for information editing and updating of knowledge graph.

In some examples, the service side may be a mobile terminal, such as a mobile phone or a tablet computer used to edit and update the information of the knowledge graph.

In some examples, the service side may be a personal computer (PC) end, such as a desktop computer or a laptop computer used to edit and update the information of the knowledge graph.

It should be understood that the foregoing examples are only examples for better understanding of the technical solutions of the embodiments of the present disclosure, and are not intended as the only limitation to the embodiments of the present disclosure.

After determining the target search content, the target search content may be sent to the service side, and the step 208 is performed.

Step 208: acquiring the target query result edited by the service side according to the target search content.

The target query result refers to a query result edited by the service side according to the target search content, that is, the query result edited by the business personnel of the service side for the target search content.

After sending the target search content to the service side, the business personnel of the service side may edit the corresponding target query results for each search sentence in the target search content, and the service side will return the target query results edited by the business personnel to the question and answering system.

After acquiring the target query results edited by the service side according to the target search content, the step 209 is performed.

Step 209: updating the knowledge base according to the target query result.

After the question and answering system acquires the target query results edited by the service side according to the target search content, the knowledge base may be updated according to the target query results. That is, in the knowledge base, the target search content is associated with the target query results and saved, so as to realize the update operation of the knowledge base.

In this embodiment, firstly, the retrieval content in the knowledge retrieval module which miss the knowledge graph is stored in the missed query log. Then, clustering analysis is performed on the retrieved content in the missed query log, to obtain the popular content retrieved by the user. Finally, the popular content obtained by clustering is returned to the front-end interface, and knowledge managers make decisions based on this, and edit new standard knowledge to update and improve the knowledge graph.

In the present disclosure, in the case that the corresponding results are not found in the knowledge base according to the search sentence, there is no need to artificially determine that which knowledge needs to be added to the knowledge base, thereby reducing the waste of human resources.

Step 210: acquiring text information and graphical information corresponding to the query result, in the case that the query result is acquired in the knowledge base according to the target query sentence.

This step 210 may include the following step 210*a*:

step 210*a*, converting a data of the query result into a graph, and obtaining graphical information corresponding to the query result.

Figure 3:
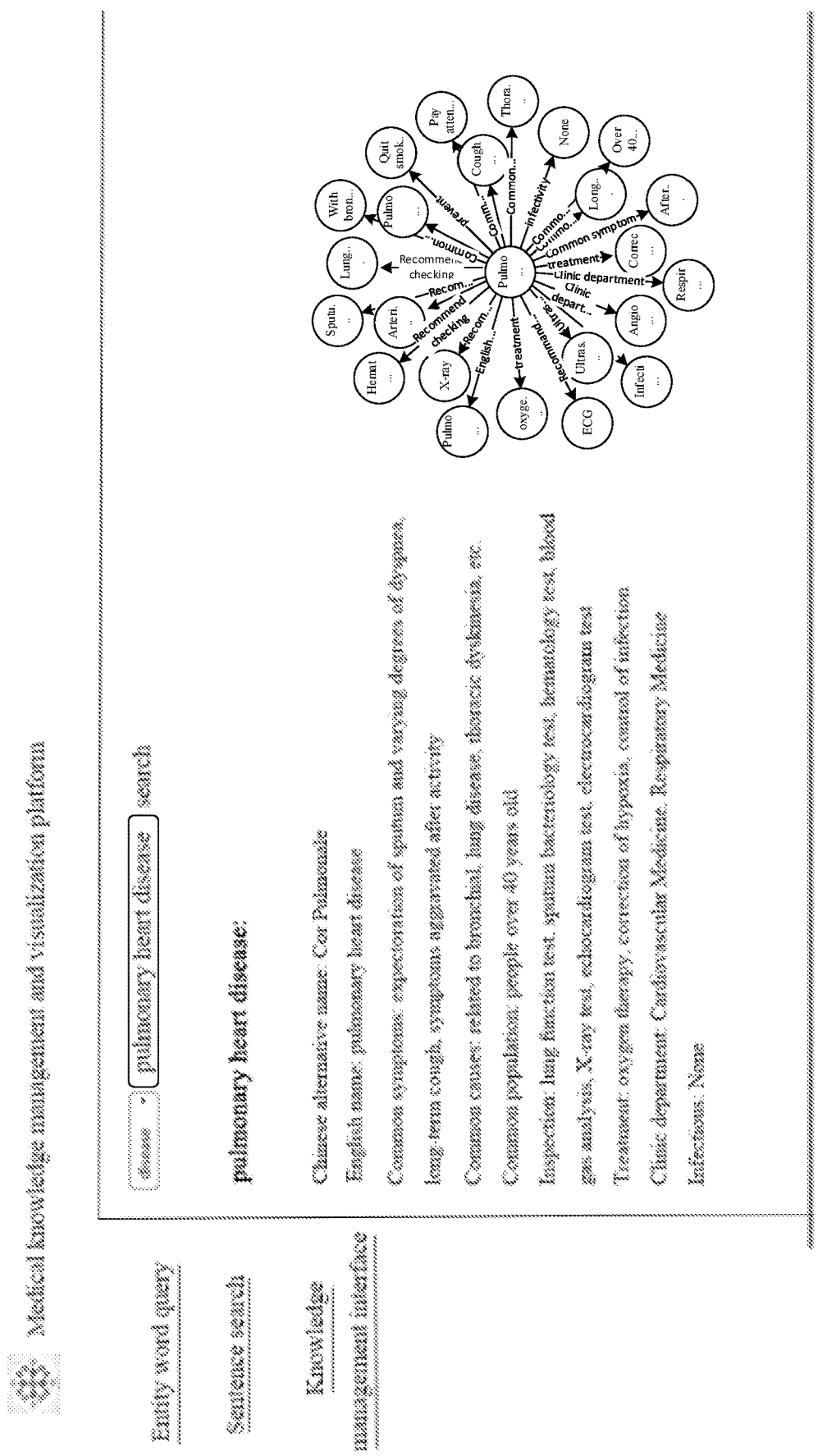
FIG. 3 illustrates a schematic diagram of a visualization of retrieval information according to an embodiment of the present disclosure.

In the case that the corresponding query result is acquired in the knowledge base according to the target query sentence, the text information and graphic information corresponding to the query result may be obtained. The text information refers to the text description information, and the graphic information refers to the graphic description information. Wherein, computer graphics and image processing technology may be used to convert the data of the query result into the graphic, to obtain the graphic information corresponding to the query result. For example, using Data Driven Documents (D3) to convert the data of the query result into graphics, it may realize the visualization of knowledge graphs. As shown in FIG. 3, for pulmonary heart disease, it may be displayed in text, with text information such as its Chinese name, English name, common symptoms, common causes, and common population. It may also be combined with diagrams to visually express related information of pulmonary heart disease.

Figure 4:
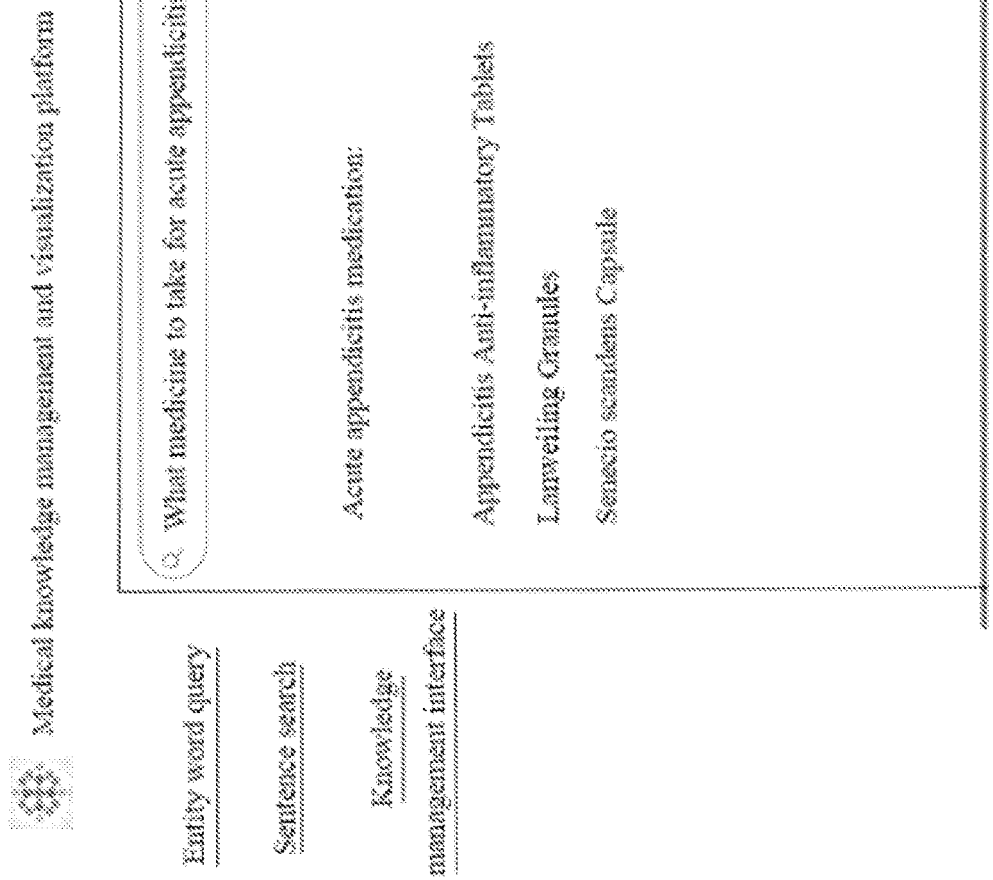
FIG. 4 illustrates a schematic diagram of another visualization of retrieval information according to an embodiment of the present disclosure.

As shown in FIG. 4, the medications for acute appendicitis may be displayed in text: Appendicitis Anti-inflammatory Tablets, Lanweiling Granules, Senecio scandens Capsule, Senecio scandens tablets, etc., and the drugs used for the treatment of appendicitis may also be graphically indicated.

In the case that the query result is acquired in the knowledge base according to the target query sentence, after the text information and graphic information corresponding to the query result are obtained, step 211 is performed.

Step 211: sending the text information and the graphical information to the user.

After obtaining the text information and graphic information corresponding to the query result, the text information and graphic information may be sent to the user, to visualize the knowledge in the knowledge graph to the user. The entire system platform may adopt the classic B/S framework, the web front end is developed using vue.js, and D3.js is used to visualize the knowledge graph. The backstage adopts spring framework configuration files and layered mode for unified management. The front-end and the backstage use RESTful API for data transmission. The sub-project spring date neo4j in sprint has functions such as support for Neo4j Cypher and may operate Neo4j database.

When using the Neo4j database, firstly, it need to install Neo4j and configure the environment variables, and then use the batch import method to import the knowledge into the database, where it need to first convert the data into CSV. In this implementation mode, knowledge including 13 types of more than 70,000 entities and 14 types of more than 200,000 entity relationship triples are written into the neo4j database in batches. The design of the database includes nodes and edges, and nodes represent named entities in the graph, the edge represents the relationship of the entities in the graph, thus completing the storage operation of the knowledge graph.

FIG. 3 shows the visual interface of the entity query result of the "pulmonary heart disease" in the above-mentioned knowledge retrieval module. FIG. 4 shows the visual interface of the search result of "What medicine to take for acute appendicitis?" in the natural sentence search. By clicking on the corresponding node on the interface, you may add, delete, check, modify, and jump to the detailed interface of the node.

In this embodiment, by displaying graphical information to the user, the intuitive display of the knowledge graph information may be realized, and the use experience of the user may be improved. The visualization layer shown in FIG. 6 may realize the knowledge update and graph visualization of the knowledge graph.

The embodiment of the present disclosure provides a data updating method, by acquiring a search sentence, determining a target query sentence corresponding to the search sentence according to a sentence type corresponding to the search sentence, in the case that a query result corresponding to the target query sentence is not found in a knowledge base, performing clustering processing for the search sentences, and obtaining at least one clustering search content, sending the target search content that meets a preset condition in the at least one clustering search content to the service side, acquiring a target query result edited by the service side according to the target search content, and updating the knowledge base according to the target query result. The embodiment of the present disclosure directly sends the search content that meets the preset condition to the service side to edit, in the case that the corresponding results are not found according to the search content of the clustering, there is no need to artificially determine that which knowledge needs to be added to the knowledge base, thereby reducing the waste of human resources, and saving labor cost.

Figure 8:
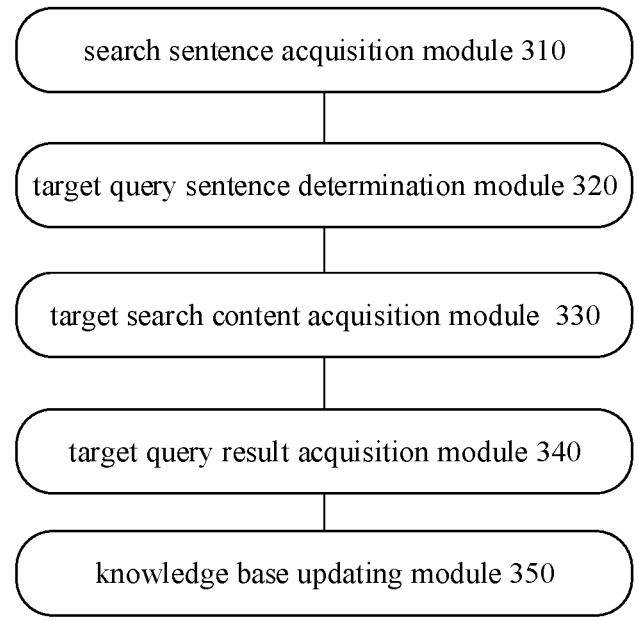
FIG. 8 illustrates a structural block diagram of a data updating apparatus according to an embodiment of the present disclosure.

With reference to FIG. 8, it is illustrated a structural block diagram of a data updating apparatus according to an embodiment of the present disclosure, the data updating apparatus may specifically include the following modules:

a search sentence acquisition module 310 configured for, acquiring a search sentence;

a target query sentence determination module 320 configured for, determining a target query sentence corresponding to the search sentence according to a sentence type corresponding to the search sentence;

a target search content acquisition module 330 configured for, determining a target search content according to the search sentence, and sending the target search content to a service side, in the case that a query result corresponding to the target query sentence is not found in a knowledge base;

a target query result acquisition module 340 configured for, acquiring a target query result edited by the service side according to the target search content; and a knowledge base updating module 350 configured for, updating the knowledge base according to the target query result.

The embodiment of the present disclosure provides a data updating apparatus, by acquiring a search sentence, determining a target query sentence corresponding to the search sentence according to a sentence type corresponding to the search sentence, in the case that a query result corresponding to the target query sentence is not found in a knowledge base, performing clustering processing for the search sentences, and obtaining at least one clustering search content, sending the target search content that meets a preset condition in the at least one clustering search content to the service side, acquiring a target query result edited by the service side according to the target search content, and updating the knowledge base according to the target query result. The embodiment of the present disclosure directly sends the search content that meets the preset condition to the service side to edit, in the case that the corresponding results are not found according to the search content of the clustering, there is no need to artificially determine that which knowledge needs to be added to the knowledge base, thereby reducing the waste of human resources, and saving labor cost.

Figure 9:
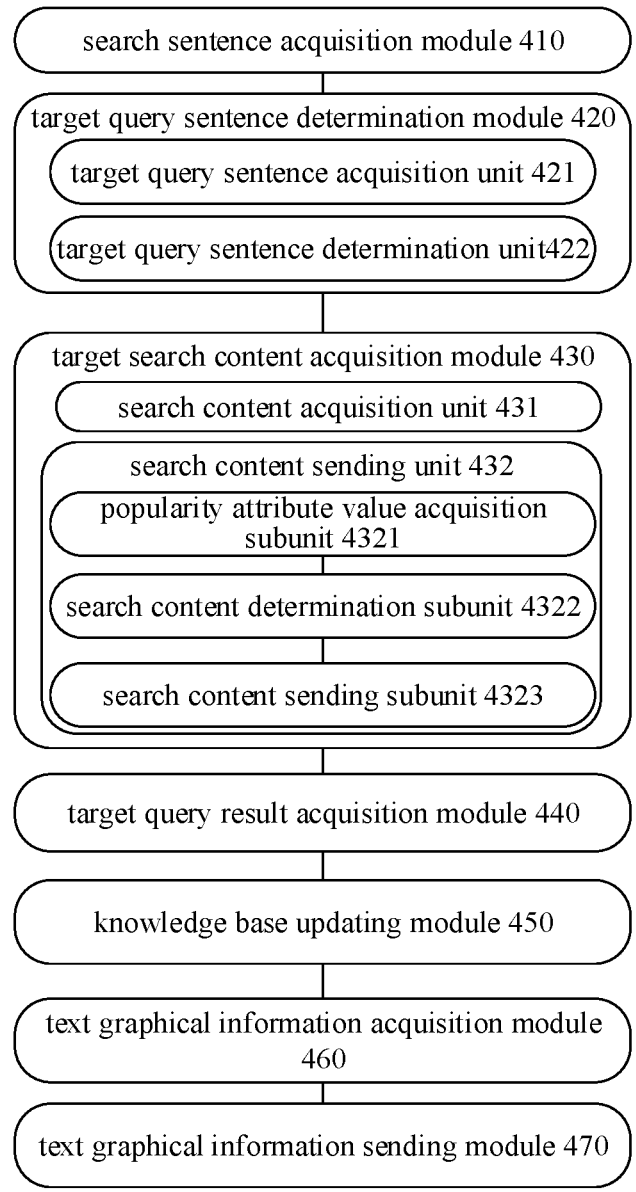
FIG. 9 illustrates a structural block diagram of another data updating apparatus according to an embodiment of the present disclosure.

With reference to FIG. 9, it is illustrated a structural block diagram of another data updating apparatus according to an embodiment of the present disclosure, the data updating apparatus may specifically include the following modules:

a search sentence acquisition module 410 configured for, acquiring a search sentence input by the user;

a target query sentence determination module 420 configured for, determining a target query sentence corresponding to the search sentence according to a sentence type corresponding to the search sentence;

a target search content acquisition module 430 configured for, determining a target search content according to the search sentence, and sending the target search content to a service side, in the case that a query result corresponding to the target query sentence is not found in a knowledge base;

a target query result acquisition module 440 configured for, acquiring a target query result edited by the service side according to the target search content;

a knowledge base updating module 450 configured for, updating the knowledge base according to the target query result;

a text graphical information acquisition module 460 configured for, acquiring text information and graphical information corresponding to the query result, in the case that the query result is acquired in the knowledge base according to the target query sentence; and a text graphical information sending module 470 configured for, sending the text information and the graphical information to a user.

Optionally, the target search content acquisition module 430 includes:

a search content acquisition unit 431 configured for, performing clustering processing for a plurality of search sentences within a preset time period, in the case that the query result corresponding to the target query sentence is not found in a knowledge base, and obtaining at least one clustering search content; and a search content sending unit 432 configured for, sending the target search content that meets a preset condition in the at least one clustering search content to the service side.

Optionally, the target query sentence determination module 420 includes:

a target query sentence acquisition unit 421 configured for, mapping the search sentence as the target query sentence, in the case that the sentence type corresponding to the search sentence is an entity word type.

Optionally, the target query sentence determination module 420 includes:

a target query sentence determination unit 422 configured for, invoking a pre-trained sentence recognition model to process the search sentence, in the case that the sentence type corresponding to the search sentence is a natural sentence type, and determining the target query sentence corresponding to the search sentence.

Optionally, the target query sentence determination unit 422 includes:

a search sentence input subunit configured for, inputting the search sentence into the sentence recognition model;

a word vector acquisition subunit configured for, acquiring a word vector corresponding to the search sentence;

an encoding vector acquisition subunit configured for, invoking a Bi-Long Short-Term Memory model layer to performing encoding processing for the word vector, and obtaining an encoding vector corresponding to the word vector;

a decoding word vector acquisition subunit configured for, invoking a Long Short-Term Memory model layer to performing decoding processing for the encoding vector, and obtaining a decoding word vector;

an entity word determination subunit configured for, invoking a classification layer to performing entity recognition processing for a decoding entity word, and determining an entity word contained in the search sentence and an entity type corresponding to the entity word;

a sentence type determination subunit configured for, invoking a Convolutional Neural Network layer to performing classification processing for the search sentence, and determining the sentence type corresponding to the search sentence; and a target query sentence determination subunit configured for, determining the target query sentence according to the entity word, the entity type, and the sentence type.

Optionally, the target query sentence determination subunit includes:

a query template determination subunit configured for, invoking the sentence recognition model to determine a query template corresponding to the sentence type according to the sentence type; and a query sentence determination subunit configured for, determining the target query sentence according to the query template, the entity word, and the entity type.

Optionally, the apparatus further includes:

a training samples acquisition module configured for, acquiring a plurality of training samples, the training samples comprises natural sentence; and a sentence recognition model training module configured for, training an initial sentence recognition model according to a plurality of natural sentences, and obtaining the sentence recognition model.

Optionally, the sentence recognition model training module comprises:

a natural sentence input unit configured for, inputting each natural sentence into the initial sentence recognition model;

a word vector acquisition unit configured for, acquiring a word vector corresponding to the natural sentence;

an encoding vector acquisition unit configured for, invoking a Bi-Long Short-Term Memory model to performing encoding processing for each word vector, and obtaining an encoding vector corresponding to an initial word vector;

an entity word acquisition unit configured for, invoking a Long Short-Term Memory model to performing decoding processing for each encoding vector, and obtaining an entity word corresponding to the natural sentence;

a prediction sentence type determination unit configured for, hybrid inputting each encoding vector into a Convolutional Neural Network, and determining a prediction sentence type corresponding to the search sentence;

a loss value calculation unit configured for, calculating a loss value corresponding to the initial sentence model, according to the prediction sentence type and an initial sentence type; and a sentence recognition model determination unit configured for, regarding the initial sentence model as the sentence recognition model in the case that the loss value is within a preset range.

Optionally, the target query sentence determination module 420 includes:

a target query template determination unit configured for, classifying the search sentence in the case that a sentence type corresponding to the search sentence is a natural sentence type, and determining a target query template corresponding to the search sentence, according to prefabricated corresponding relationship between types of the search sentences and a plurality of query templates;

an entity word determination unit configured for, performing entity recognition processing for the search sentence, and determining an entity word contained in the search sentence; and a target query sentence unit configured for, determining the target query sentence according to the target query template and the entity word.

Optionally, the search content sending unit 432 includes:

a popularity attribute value acquisition subunit 4321 configured for, acquiring a popularity attribute value corresponding to the at least one clustering search content;

a search content determination subunit 4322 configured for, acquiring a clustering search content with the popularity attribute value greater than or equal to a set attribute value in the at least one clustering search content, according to each popularity attribute value, determining the clustering search content with the popularity attribute value greater than or equal to the set attribute value as the target search content; and a search content sending subunit 4323 configured for, sending the target search content to the service side.

Optionally, the apparatus further includes:

a text graphical information acquisition module configured for, acquiring text information and graphical information corresponding to the query result, in the case that the query result is acquired in the knowledge base according to the target query sentence; and a text graphical information sending module configured for, sending the text information and the graphical information to a user.

The embodiment of the present disclosure provides a data updating apparatus, by acquiring a search sentence, determining a target query sentence corresponding to the search sentence according to a sentence type corresponding to the search sentence, in the case that a query result corresponding to the target query sentence is not found in a knowledge base, performing clustering processing for the search sentences, and obtaining at least one clustering search content, sending the target search content that meets a preset condition in the at least one clustering search content to the service side, acquiring a target query result edited by the service side according to the target search content, and updating the knowledge base according to the target query result. The embodiment of the present disclosure directly sends the search content that meets the preset condition to the service side to edit, in the case that the corresponding results are not found according to the search content of the clustering, there is no need to artificially determine that which knowledge needs to be added to the knowledge base, thereby reducing the waste of human resources, and saving labor cost.

For the foregoing method embodiments, for the sake of simple description, they are all expressed as a series of action combinations, but those skilled in the art should know that the present disclosure is not limited by the described sequence of actions, because according to the present disclosure, some steps may be performed in other order or at the same time. Secondly, those skilled in the art should also know that the embodiments described in the specification are all optional embodiments, and the involved actions and modules are not necessarily required by the present disclosure.

Additionally, an embodiment of the present disclosure further provides an electronic device, the electronic device includes: a processor, a memory, and a computer program stored in the memory and executed by the processor, when the computer program is executed by the processor, the data updating method according to any one of the above embodiments.

An embodiment of the present disclosure further provides a computer-readable storage medium, when instructions in the storage medium are executed by a processor of an electronic device, the instructions cause the electronic device to perform the data updating method according to any one of the above embodiments.

Each component embodiment of the present application may be implemented by hardware, or by software modules that are operated on one or more processors, or by a combination thereof. A person skilled in the art should understand that some or all of the functions of some or all of the components of the electronic device according to the embodiments of the present application may be implemented by using a microprocessor or a digital signal processor (DSP) in practice. The present application may also be implemented as apparatus or device programs (for example, computer programs and computer program products) for implementing part of or the whole of the method described herein. Such programs for implementing the present application may be stored in a computer-readable medium, or may be in the form of one or more signals. Such signals may be downloaded from an Internet website, or provided on a carrier signal, or provided in any other forms.

Figure 10:
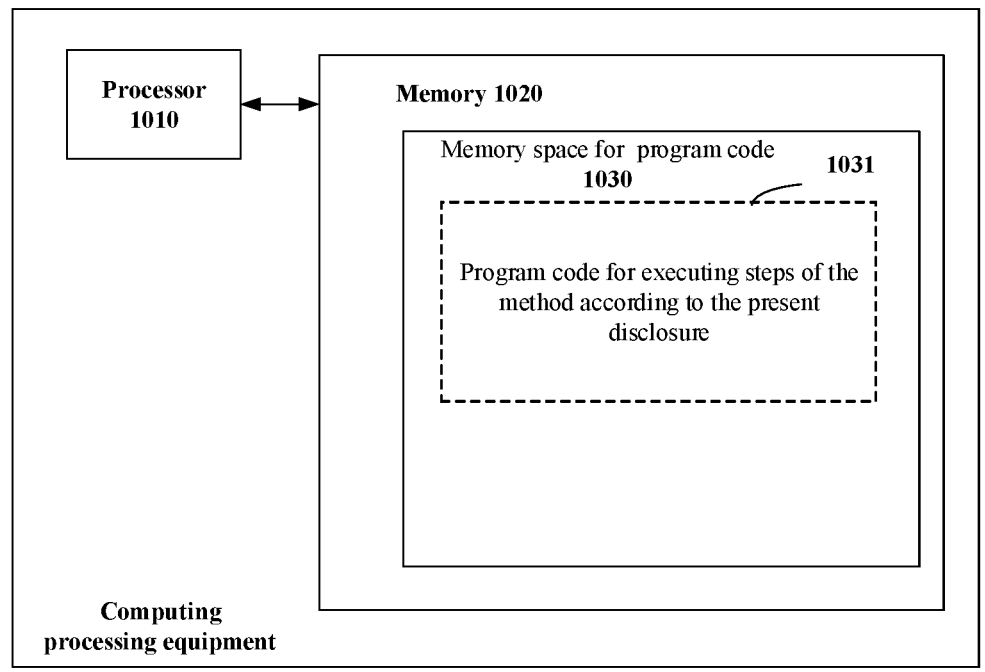
FIG. 10 schematically illustrates a block diagram of a computing apparatus for performing the method according to the present disclosure.
Figure 11:
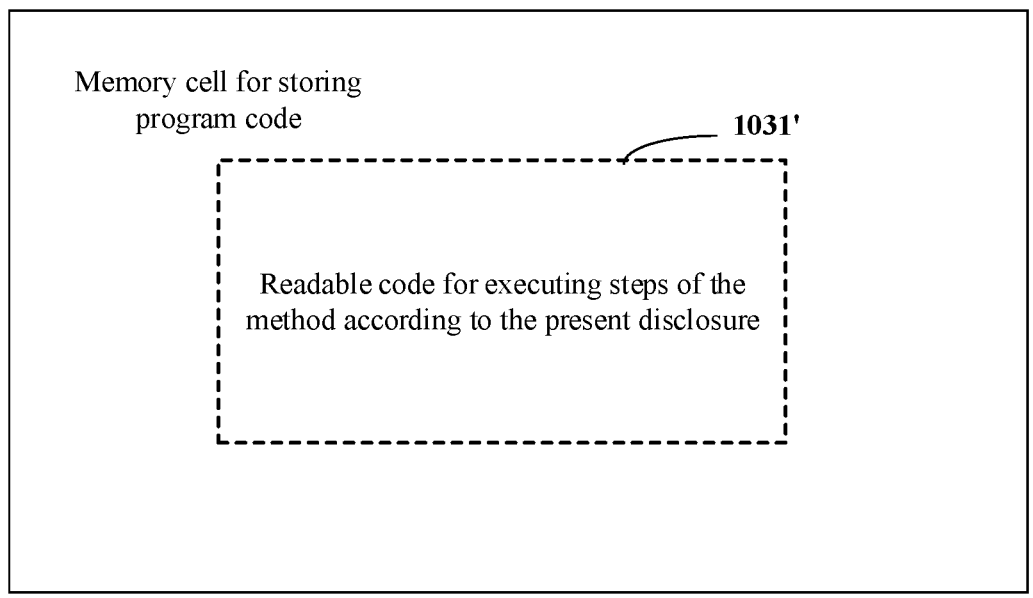
FIG. 11 schematically illustrates a memory cell for maintaining or carrying a program code for implementing the method according to the present disclosure.

For example, FIG. 10 shows a computing processing device that can implement the method according to the present application. The electronic device traditionally comprises a processor 1010 and a computer program product or computer-readable medium in the form of a memory 1020. The memory 1020 may be electronic memories such as flash memory, EEPROM (Electrically Erasable Programmable Read Only Memory), EPROM, hard disk or ROM. The memory 1020 has the storage space 1030 of the program code 1031 for implementing any steps of the above method. For example, the storage space 1031 for program code may contain program codes 1031 for individually implementing each of the steps of the above method. Those program codes may be read from one or more computer program products or be written into the one or more computer program products. Those computer program products include program code carriers such as hard disk, compact disk (CD), memory card or floppy disk as shown in FIG. 11. Such computer program products are usually portable or fixed storage units. The storage unit may have storage segments or storage spaces with similar arrangement to the memory 1020 of the electronic device in FIG. 10. The program codes may for example be compressed in a suitable form. Generally, the storage unit contains a computer-readable code 1031', which can be read by a processor like 1010. When those codes are executed by the electronic device, the codes cause the electronic device to implement each of the steps of the method described above.

The embodiments in the disclosure are described step by step, the important part of each embodiment mainly lies in the difference between other embodiments, the same or similar part between each of the embodiments may be referred to each other.

At last, it should be noted that, in the present disclosure, the relational terms such as the first and the second are merely used to separate one entity or operation from another entity or operation, rather than requiring or implying practical relation or sequence of these entities or operations. In addition, the term "comprise" or "include" or variant forms thereof represents the including but not limiting, thusly the process, method, product or apparatus which includes essentials may not only include those essentials, but also include other essentials which are not listed definitely, or may include the initial essentials of the process, method, product or apparatus. In the case that no more limitation is given, the essentials limited by the term "including a" does not preclude other same or similar essentials exist in the process, method, product, or apparatus.

The data updating method and apparatus, electronic device, and computer readable storage medium provided in the present disclosure are described in detail, specific case are used in the present disclosure to illustrate the principle of the application, the illustration of the embodiments is just for helping understanding the method and core concept of the application, meanwhile, for one of ordinary skill in the art, according to the thought of the application, the specific embodiments and applications may be changed, to sum up, the description should not be understood as the restriction to the application.

The invention claimed is:

1. A data updating method, wherein the method comprises:
acquiring a search sentence;
determining a target query sentence corresponding to the search sentence according to a sentence type corresponding to the search sentence;
determining a target search content according to the search sentence, in a case that a query result corresponding to the target query sentence is not found in a knowledge base, and sending the target search content to a service side;
acquiring a target query result edited by the service side according to the target search content; and
updating the knowledge base according to the target query result,
wherein determining the target query sentence corresponding to the search sentence according to the sentence type corresponding to the search sentence, comprises:
invoking a pre-trained sentence recognition model to process the search sentence, in a case that the sentence type corresponding to the search sentence is a natural sentence type, and determining the target query sentence corresponding to the search sentence; and
wherein invoking the pre-trained sentence recognition model to process the search sentence, and determining the target query sentence corresponding to the search sentence, comprises:
inputting the search sentence into the sentence recognition model;
acquiring a word vector corresponding to the search sentence;
invoking a Bi-Long Short-Term Memory model layer to performing encoding processing for the word vector, and obtaining an encoding vector corresponding to the word vector;
invoking a Long Short-Term Memory model layer to performing decoding processing for the encoding vector, and obtaining a decoding word vector;
invoking a classification layer to performing entity recognition processing for the decoding word vector, and determining an entity word contained in the search sentence and an entity type corresponding to the entity word;
invoking a Convolutional Neural Network layer to performing classification processing for the search sentence, and determining the sentence type corresponding to the search sentence; and
determining the target query sentence according to the entity word, the entity type, and the sentence type.

2. The method according to claim 1, wherein determining the target search content according to the search sentence, in the case that the query result corresponding to the target query sentence is not found in the knowledge base, and sending the target search content to the service side, comprises:
performing clustering processing for a plurality of search sentences within a preset time period, in the case that the query result corresponding to the target query sentence is not found in the knowledge base, and obtaining at least one clustering search content; and
sending the target search content that meets a preset condition in the at least one clustering search content, to the service side.

3. The method according to claim 2, wherein sending the target search content that meets the preset condition in the at least one clustering search content to the service side, comprises:
acquiring a popularity attribute value corresponding to the at least one clustering search content;

acquiring the clustering search content with the popularity attribute value greater than or equal to a set attribute value in the at least one clustering search content, according to each popularity attribute value, determining the clustering search content with the popularity attribute value greater than or equal to the set attribute value as the target search content; and sending the target search content to the service side.

4. The method according to claim 1, wherein determining the target query sentence corresponding to the search sentence according to the sentence type corresponding to the search sentence, comprises:

mapping the search sentence as the target query sentence, in a case that the sentence type corresponding to the search sentence is an entity word type.

5. The method according to claim 1, wherein determining the target query sentence according to the entity word, the entity type and the sentence type, comprises:

invoking the sentence recognition model, to determine a query template corresponding to the sentence type according to the sentence type; and determining the target query sentence according to the query template, the entity word, and the entity type.

6. The method according to claim 1, wherein pre-training of the sentence recognition model, comprises:

acquiring a plurality of training samples, the plurality of training samples comprises a plurality of natural sentences; and training an initial sentence recognition model according to the plurality of natural sentences, and obtaining the sentence recognition model.

7. The method according to claim 6, wherein training the initial sentence recognition model according to the plurality of natural sentences, and obtaining the sentence recognition model, comprises:

inputting each of the plurality of natural sentences into the initial sentence recognition model;

acquiring a word vector corresponding to each of the plurality of natural sentences, wherein each of the plurality of natural sentences corresponds to an initial sentence type;

invoking the Bi-Long Short-Term Memory model to performing encoding processing for each word vector corresponding to the natural sentence, and obtaining an encoding vector corresponding to the word vector corresponding to the natural sentence;

invoking the Long Short-Term Memory model to performing decoding processing for each encoding vector corresponding to the word vector corresponding to the natural sentence, and obtaining an entity word corresponding to the natural sentence;

hybrid inputting each encoding vector corresponding to the word vector corresponding to the natural sentence into the Convolutional Neural Network, and determining a prediction sentence type corresponding to the search sentence;

calculating a loss value corresponding to the initial sentence recognition model, according to the prediction sentence type and the initial sentence type; and regarding the initial sentence recognition model as the sentence recognition model in a case that the loss value is within a preset range.

8. The method according to claim 1, wherein after determining the target query sentence corresponding to the search sentence according to the sentence type corresponding to the search sentence, the method further comprises:

acquiring text information and graphical information corresponding to the query result, in a case that the query result is acquired in the knowledge base according to the target query sentence; and sending the text information and the graphical information to a user.

9. The method according to claim 8, wherein acquiring text information and graphical information corresponding to the query result, in the case that the query result is acquired in the knowledge base according to the target query sentence, comprises:

converting data of the query result into a graph, and obtaining the graphical information corresponding to the query result.

10. An electronic device, wherein the electronic device comprises:

a processor, a memory, and a computer program stored in the memory and executed by the processor, when the computer program is executed by the processor, performing the operations comprising:

acquiring a search sentence;

determining a target query sentence corresponding to the search sentence according to a sentence type corresponding to the search sentence;

determining a target search content according to the search sentence, in a case that a query result corresponding to the target query sentence is not found in a knowledge base, and sending the target search content to a service side;

acquiring a target query result edited by the service side according to the target search content; and updating the knowledge base according to the target query result wherein determining the target query sentence corresponding to the search sentence according to the sentence type corresponding to the search sentence, comprises:

invoking a pre-trained sentence recognition model to process the search sentence, in a case that the sentence type corresponding to the search sentence is a natural sentence type, and determining the target query sentence corresponding to the search sentence; and wherein invoking the pre-trained sentence recognition model to process the search sentence, and determining the target query sentence corresponding to the search sentence, comprises:

inputting the search sentence into the sentence recognition model;

acquiring a word vector corresponding to the search sentence;

invoking a Bi-Long Short-Term Memory model layer to performing encoding processing for the word vector, and obtaining an encoding vector corresponding to the word vector;

invoking a Long Short-Term Memory model layer to performing decoding processing for the encoding vector, and obtaining a decoding word vector;

invoking a classification layer to performing entity recognition processing for the decoding word vector, and determining an entity word contained in the search sentence and an entity type corresponding to the entity word;

invoking a Convolutional Neural Network layer to performing classification processing for the search sentence, and determining the sentence type corresponding to the search sentence; and determining the target query sentence according to the entity word, the entity type, and the sentence type.

11. The electronic device according to claim 10, wherein determining the target search content according to the search sentence, in the case that the query result corresponding to the target query sentence is not found in the knowledge base, and sending the target search content to the service side, comprises:
performing clustering processing for a plurality of search sentences within a preset time period, in the case that the query result corresponding to the target query sentence is not found in the knowledge base, and obtaining at least one clustering search content; and
sending the target search content that meets a preset condition in the at least one clustering search content to the service side.

12. The electronic device according to claim 10, wherein determining the target query sentence corresponding to the search sentence according to the sentence type corresponding to the search sentence, comprises:
mapping the search sentence as the target query sentence, in a case that the sentence type corresponding to the search sentence is an entity word type.

13. The electronic device according to claim 10, wherein determining the target query sentence corresponding to the search sentence according to the sentence type corresponding to the search sentence, comprises:
invoking a pre-trained sentence recognition model to process the search sentence, in a case that the sentence type corresponding to the search sentence is a natural sentence type, and determining the target query sentence corresponding to the search sentence.

14. A non-transitory computer-readable storage medium, wherein when instructions in the storage medium are executed by a processor of an electronic device, the instructions cause the electronic device to perform the operations comprising:
acquiring a search sentence;
determining a target query sentence corresponding to the search sentence according to a sentence type corresponding to the search sentence;
determining a target search content according to the search sentence, in a case that a query result corresponding to the target query sentence is not found in a knowledge base, and sending the target search content to a service side;
acquiring a target query result edited by the service side according to the target search content; and
updating the knowledge base according to the target query result,
wherein determining the target query sentence corresponding to the search sentence according to the sentence type corresponding to the search sentence, comprises:
invoking a pre-trained sentence recognition model to process the search sentence, in a case that the sentence type corresponding to the search sentence is a natural sentence type, and determining the target query sentence corresponding to the search sentence; and wherein invoking the pre-trained sentence recognition model to process the search sentence, and determining the target query sentence corresponding to the search sentence, comprises:
inputting the search sentence into the sentence recognition model;
acquiring a word vector corresponding to the search sentence;
invoking a Bi-Long Short-Term Memory model layer to performing encoding processing for the word vector, and obtaining an encoding vector corresponding to the word vector;
invoking a Long Short-Term Memory model layer to performing decoding processing for the encoding vector, and obtaining a decoding word vector;
invoking a classification layer to performing entity recognition processing for the decoding word vector, and determining an entity word contained in the search sentence and an entity type corresponding to the entity word;
invoking a Convolutional Neural Network layer to performing classification processing for the search sentence, and determining the sentence type corresponding to the search sentence; and
determining the target query sentence according to the entity word, the entity type, and the sentence type.

15. The non-transitory computer-readable storage medium according to claim 14, wherein determining the target search content according to the search sentence, in the case that the query result corresponding to the target query sentence is not found in the knowledge base, and sending the target search content to the service side comprises:
performing clustering processing for a plurality of search sentences within a preset time period, in the case that the query result corresponding to the target query sentence is not found in the knowledge base, and obtaining at least one clustering search content; and
sending the target search content that meets a preset condition in the at least one clustering search content to the service side.

16. The non-transitory computer-readable storage medium according to claim 14, wherein determining the target query sentence corresponding to the search sentence according to the sentence type corresponding to the search sentence, comprises:
mapping the search sentence as the target query sentence, in a case that the sentence type corresponding to the search sentence is an entity word type.

17. The non-transitory computer-readable storage medium according to claim 14, wherein determining the target query sentence corresponding to the search sentence according to the sentence type corresponding to the search sentence, comprises:
invoking a pre-trained sentence recognition model to process the search sentence, in a case that the sentence type corresponding to the search sentence is a natural sentence type, and determining the target query sentence corresponding to the search sentence.

\* \* \* \* \*